April 26, 1966 G. B. THOMPSON 3,248,498

BALANCED REED SWITCH

Filed Sept. 25, 1964

INVENTOR
Gordon B. Thompson
BY Harold A. Weir
PATENT AGENT

United States Patent Office 3,248,498
Patented Apr. 26, 1966

3,248,498
BALANCED REED SWITCH

Gordon B. Thompson, Ottawa, Ontario, Canada, assignor to Northern Electric Company Limited, Montreal, Quebec, Canada Filed Sept. 25, 1964, Ser. No. 399,180
11 Claims. (Cl. 200—87)

Figures 1, 2:
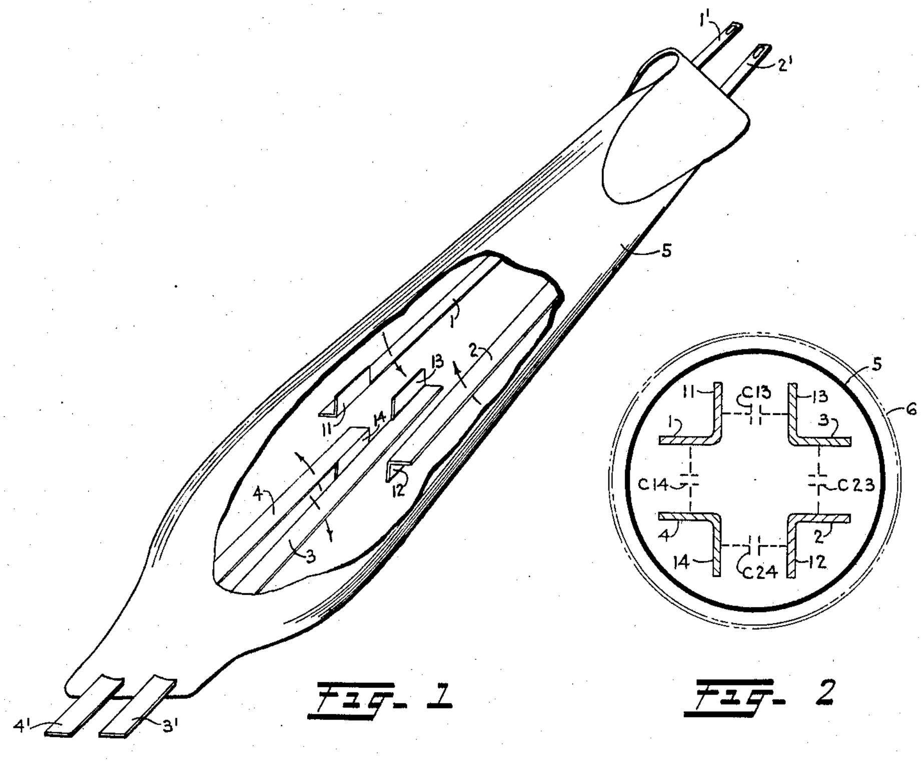

This invention relates to switching devices useful at high frequencies, in particular it relates to a reed switch for use in a high frequency balanced line.

Conventional switching elements have an inherent capacitance which exists across the switch contacts when the contacts are open. In conventional switching devices this capacitance is troublesome when the devices are used to switch circuits handling high frequencies. When these switching devices are used in circuits carrying signals in the frequency range upwards from one megacycle/second, the capacitance across the open switch contacts couples the input circuit of the switch to the output circuit of the switch. In a conventional miniature reed switch, which may have an open contact capacity of the order of one picofarad or less, there may be considerable leakage across the switch contacts at signal frequencies of the order of several megacycles/second or higher. This leakage is, of course, undesirable.

A known arrangement for reducing or eliminating the signal leakage resulting from the capacitance existing across the open contacts in a conventional reed switch is to replace each single set of contacts with two sets of make contacts and a set of break contacts. The two sets of make contacts are arranged in series with the transmission path and the break contacts connect the junction between the two sets of series connected make contacts to ground. Thus, when the switching arrangement is actuated to complete the circuit the two sets of make contacts are closed to provide a continuous path from the input to the output, and the break contact is opened so that there is no connection to ground. When the switching arrangement is actuated to interrupt the circuit the two make contacts are opened and the break contact is closed. The coupling formed by the capacitance across the open series connected contacts, which would normally provide a path for high frequency signals, is ineffective because the junction point between the series contacts is grounded.

A similar arrangement is known for use in a balanced line system. This switching arrangement requires two sets of make contacts in series with each line and one set of break contacts connected between the junction of the series connected make contacts in one line and the similar junction in the other line. Thus, this switching arrangement requires five sets of contacts to reduce or eliminate the leakage of high frequency signals from that which would occur in a balanced line switching system using a single set of contacts in each line. It will be apparent that this known switching arrangement greatly increases the size and complexity of any system in which it is employed.

A switching system which reduces or eliminates high frequency signal leakage, but is of simple design and small size is, of course, very desirable.

It is therefore an object of this invention to provide an improved reed switch for a balanced line, the switch being of novel design.

It is another object of this invention to provide a reed switch for a balanced line which reduces the effect of unwanted coupling by the capacitance across open switch contacts.

Figure 3:
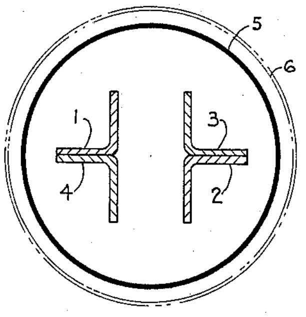
Figure 4:
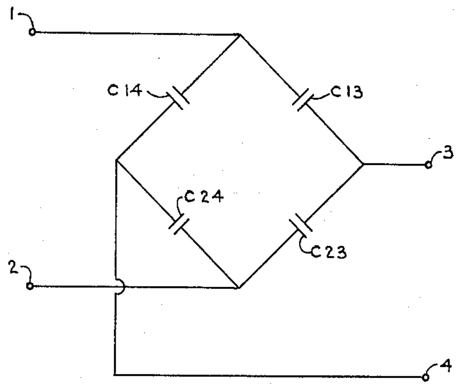

These and other objects and advantages of the invention will appear in the following description taken in conjunction with the accompanying drawings, in which:

FIGURE 1 is a view of a magnetic reed switch in accordance with the invention, with part of the switch housing or envelope cut away, FIGURES 2 and 3 are cross-sectional views taken through the switch contacts depicting the contacts in their open or break condition and in their closed or make condition respectively, and FIGURE 4 is a schematic diagram which indicates the relationship of various capacitances existing across the open switch contacts and which is useful in explaining the invention.

FIGURE 1 illustrates one embodiment of the switch according to this invention. An envelope or housing 5, made of glass or some other suitable non-magnetic material, contains four flexible reeds 1–4 made of a conducting magnetic material. The reeds 1–4 preferably are formed from a high permeability material. The reeds 1 and 2 pass through one end of envelope 5 and the reeds 3 and 4 pass through the opposite end of envelope 5. The reeds 1–4 are secured to the envelope 5 where they pass through it. The ends of reeds 1–4 which project externally of envelope 5 form terminals bearing corresponding designations 1′–4′.

Within the envelope the reeds 1 and 4 are arranged as shown so that their free ends may flex towards and away from one another. Similarly reeds 2 and 3 are arranged so that their free ends may flex towards and away from one another. In other words, the free ends of reeds 1 and 4 are in overlying or overlapping relationship with respect to one another, and the free ends of reeds 2 and 3 are in overlying or overlapping relationship with respect to one another. Suitable contacting surfaces are provided on the end portions of reeds 1 and 4 where they engage each other and on end portions of reeds 2 and 3 where they engage each other. The envelope 5 is preferably hermetically sealed and may be filled with an inert atmosphere of neon, helium, argon or some other non-corrosive gas, to prolong the life of the contacts.

A coil 6 is wound outside th envelope 5, as indicated in phantom in FIGURES 2 and 3, with its axis extending longitudinally, that is substantially in the direction of the reeds. Thus, when the coil is energized the free ends of the reeds lie in a magnetic field directed along the axes of the reeds.

The operation of magnetically actuated reed switches is well known and will be described very briefly. When the coil 6 is not energized the reeds assume the positions shown in FIGURE 1 with the free ends spaced apart as seen in FIGURES 1 and 2. When the coil 6 is energized a magnetic field is developed acting along the length of the reeds. As a result, opposite magnetic poles are induced at the free ends of reeds 1 and 4 and the reeds are attracted towards each other. Since the flexible reeds are capable of movement in the direction shown by the arrows in FIGURE 1 contact is established between reeds 1 and 4 as shown in FIGURE 3. Similarly contact is established between reeds 2 and 3.

In the switch of this invention the reed structure is altered by having additional conducting portions or tabs 11, 12, 13 and 14 arranged at the ends of reeds 1, 2, 3 and 4 respectively. As shown in FIGURES 1, 2 and 3 the conducting portions are arranged substantially at right angles to the flat surfaces of the reeds and so oriented to increase the capacitive coupling between reeds 1 and 3 and between reeds 2 and 4 without appreciably affecting the capacitive coupling between reeds 1 and 4 and between reeds 2 and 3. In the drawings the additional conducting portions or tabs are shown as rectangular, but the shape is unimportant and various other shapes may obviously be used. The word tab is intended to include a conducting portion of any shape which may be added to the flat reed.

In the following description the capacitance existing between any pair of reeds will be indicated by the use of modifying numerals following the letter C. For example, C13 represents the capacitance between reeds 1 and 3.

The effect of the additional capacitances C13 and C24 may be shown by considering FIGURE 4 in which the capacitive connections between input reeds 1 and 2 and output reeds 3 and 4 are drawn in the form of a bridge. It is clear that when the bridge is in a balanced condition there will be no coupling from input lines 1 and 2 to output lines 3 and 4. The condition for bridge balance is:

$$\frac{C13}{C23}=\frac{C14}{C24} \quad [A]$$

Without the presence of tabs 11–14, C14 and C23 are approximately equal and much greater than C13 and C24. The effect of tabs 11–14 is to increase C13 and C24 so that Equation A is satisfied. The special case when all the capacitances are equal obviously results in a balanced condition.

The tabs 11–14 may be formed as an integral part of the reeds 1–4. It is not necessary, however, that conducting tabs 11–14 should be formed from magnetic material.

With the reed switch according to this invention as hereinbefore described, the capacitive coupling or leakage between the switch input and switch output when the switch is open, is eliminated or greatly reduced.

I claim:

1. A reed switch comprising,
a first, a second, a third and a fourth reed each having a mounting portion and a contacting portion spaced longitudinally on the reed,
supporting means engaging the mounting portions of said reeds and supporting said reeds with the contacting portions only of said first and fourth reeds being in overlying relationship with one another and of said second and third reeds being in overlying relationship with one another,
said contacting portions of said reeds being disposed in a rest position defining corners of a rectangle, the contacting portion of the first reed being diagonally opposite the contacting portion of said second reed,
said first and fourth reeds being movable to a flexed position with the contacting portions thereof in engagement,
said second and third reeds being movable to a flexed position with the contacting portions thereof in engagement,
said first and fourth reeds having in said rest position a first capacitance therebetween,
said second and third reeds having in said rest condition a second capacitance therebetween,
tabs on said first and third reeds having a third capacitance therebetween,
tabs on said second and fourth reeds having a fourth capacitance therebetween,
the ratio of the first to the fourth capacitance being substantially equal to the ratio of the third to the second capacitance.

2. A reed switch comprising,
an envelope,
a first and a second reed each having a mounting portion and a contacting portion and each being supported at the mounting portion thereof at one end of said envelope,
a third and a fourth reed each having a mounting portion and a contacting portion and each being supported at the mounting portion thereof at the other end of said envelope,
said first and fourth reeds being arranged with the contacting portions thereof in spaced apart overlapping relationship,
said second and third reeds being arranged with the contacting portions in spaced apart overlapping relationship, said reeds having a rest position with said contacting portions defining the corners of a rectangle, the contacting portion of said first reed being at a corner adjacent to the corners occupied by said third and fourth reeds,
said first and fourth reeds having a first capacitance therebetween in said rest position,
said second and third reeds having a second capacitance therebetween in said rest position,
said first and fourth reeds being flexible from said rest position to a position with the contacting portions thereof in engagement,
said second and third reeds being flexible from said rest position to a position with the contacting portions thereof in engagement,
tabs on said first and third reeds having a third capacitance therebetween, and
tabs on said second and fourth reeds having a fourth capacitance therebetween,
the ratio of the first to the fourth capacitance being substantially equal to the ratio of the third to the second capacitance.

3. A reed switch comprising,
a switch housing having opposed first and second wall portions,
a first and a second reed mounted to said first wall portion and extending in a direction towards said second wall portion,
a third and a fourth reed mounted to said second wall portion and extending in a direction towards said first wall portion,
said first and fourth reeds having terminating end portions in overlying relationship with one another and being so constructed and arranged to flex towards one another to an engaged position with said end portions engaged and away from one another to a spaced apart position with a first capacitance therebetween,
said second and third reeds having terminating end portions in overlying relationship with one another and being so constructed and arranged to flex towards one another to an engaged position with said end portions engaged and away from one another to a spaced apart position with a second capacitance therebetween,
in said spaced apart positions of said first and fourth reeds and of said second and third reeds, the terminating end portions of said first and third reeds being in substantially side by side relationship and of said second and fourth reeds being in substantially side by side relationship,
tabs on said first and third reeds having a third capacitance therebetween, and
tabs on said second and fourth reeds having a fourth capacitance therebetween,
the ratio of the first to the fourth capacitance being substantially equal to the ratio of the third to the the second capacitance.

4. A reed switch comprising,
a non-magnetic switch housing having opposed first and second wall portions,
a first and a second flexible magnetic conducting reed mounted to said first wall portion at a mounting portion thereof and extending within said housing in a direction towards said second wall portion,
a third and a fourth flexible magnetic conducting reed mounted to said second wall portion at a mounting portion thereof and extending within said housing in a direction towards said first wall portion,
said first and fourth reeds having terminating end portions in overlying relationship with one another and being so constructed and arranged to be movable between a first rest position with the terminating end portions spaced apart from one another and having a first capacitance therebetween and a second position with the terminating end portions in engagement, said second and third reeds having terminating end portions in overlying relationship with one another and being so constructed and arranged to be movable between a first rest position with the terminating end portions spaced apart from one another and having a second capacitance therebetween and a second position with the terminating end portions in engagement, means for inducing a magnetic field along said reeds for moving said reeds from said first to said second position, the terminating end portions of said first and third reeds in said first position being substantially in side by side relationship, and of said second and fourth reeds in said first position being substantially in side by side relationship, conducting tabs on said first and third reeds having a third capacitance therebetween, and conducting tabs on said second and fourth reeds having a fourth capacitance therebetween, the ratio of the first to the fourth capacitance being substantially equal to the ratio of the third to the second capacitance.

5. A reed switch as defined in claim 4 in which said switch housing extends from said first and second wall portions to enclose the terminating end portions of said reeds and is hermetically sealed.

6. A reed switch as defined in claim 4 in which said mounting portions of said reeds extend externally of said switch housing, forming, on the outside, first, second, third and fourth terminals making connection with said first, second, third and fourth reeds respectively.

7. A reed switch as defined in claim 6 in which said first and second terminals are connected to a first balanced line, and said third and fourth terminals are connected to a second balanced line.

8. A reed switch as defined in claim 4 in which each reed is of substantially flat configuration having a pair of closely spaced parallel surfaces.

9. A reed switch as defined in claim 8 in which said parallel surfaces are normal to the path of flection.

10. A reed switch as defined in claim 9 in which the parallel surfaces of said first reed are substantially coplanar with the parallel surfaces of said third reed in the first position and the parallel surfaces of said second reed are substantially coplanar with the parallel surfaces of said fourth reed in the first position.

11. A reed switch as defined in claim 4 in which said means for inducing a magnetic field comprise a solenoidal coil arranged externally to said housing with its axis substantially coincident with said direction of extension of the reeds and so situated along said axis to encompass said terminating end portions of the reeds.

No references cited.

BERNARD A. GILHEANY, *Primary Examiner.*